2,988,159
UNIVERSAL TRUNNION MOUNTING FOR EQUALIZER MEMBER OF A MATERIAL HANDLING MACHINE

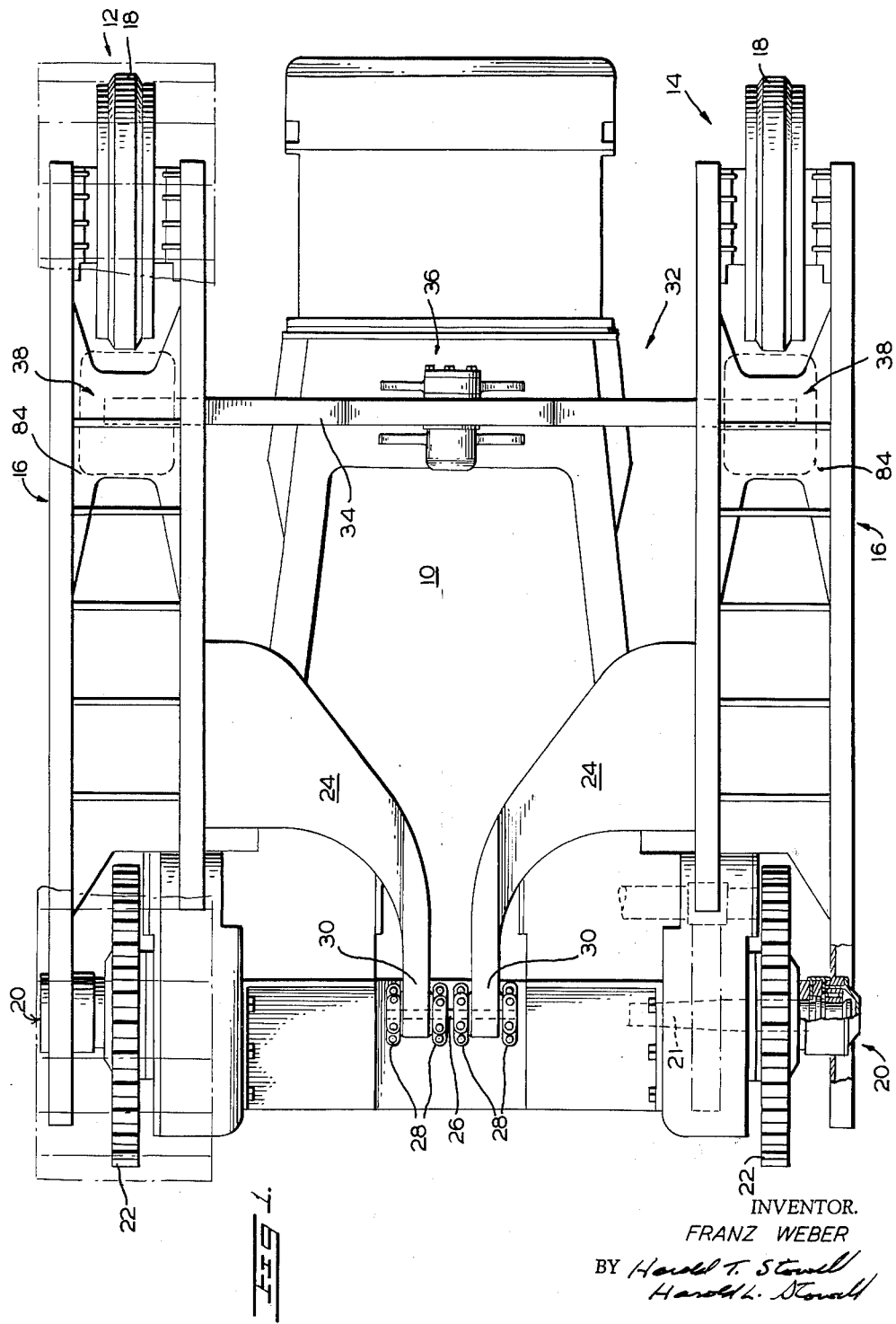

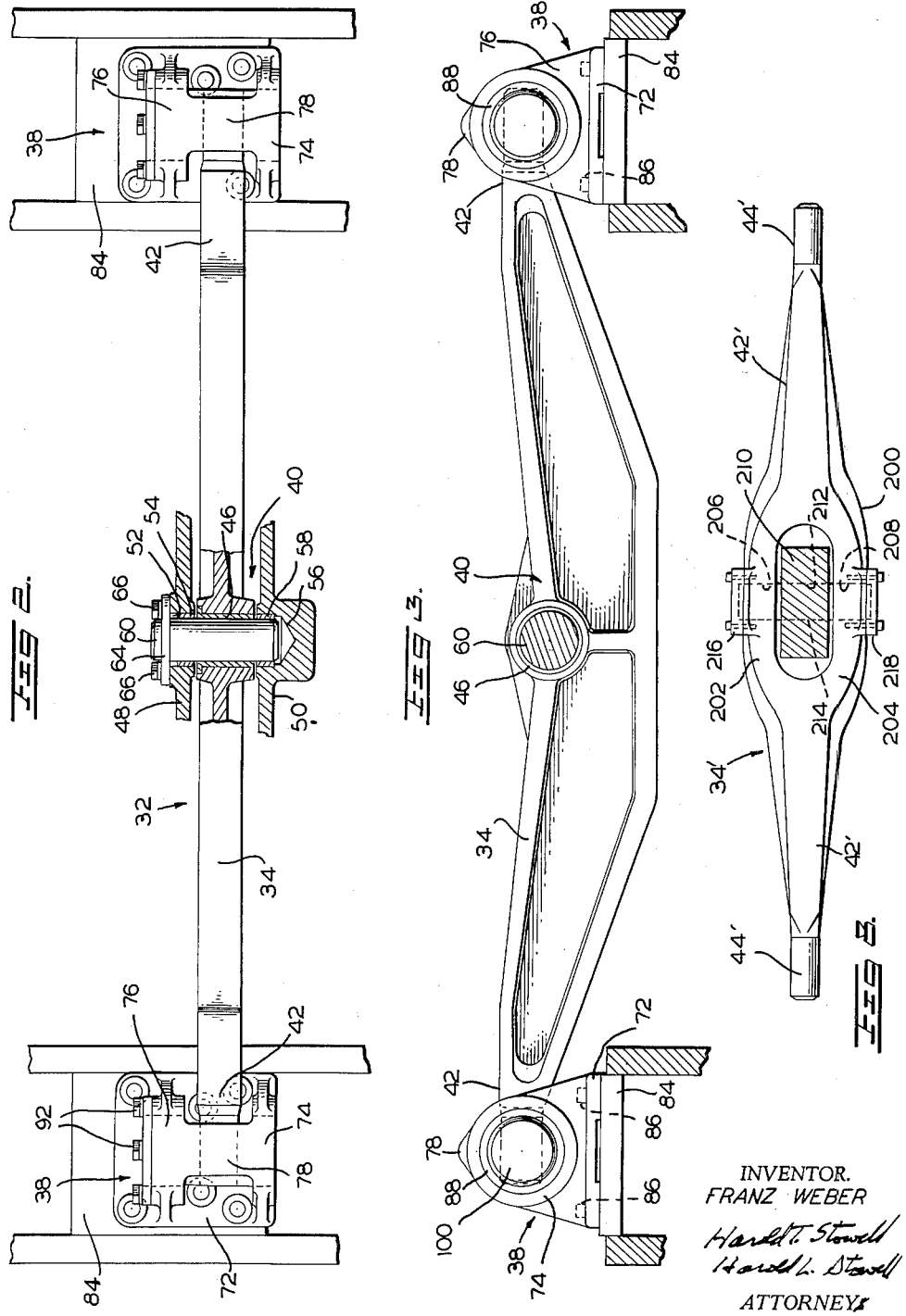

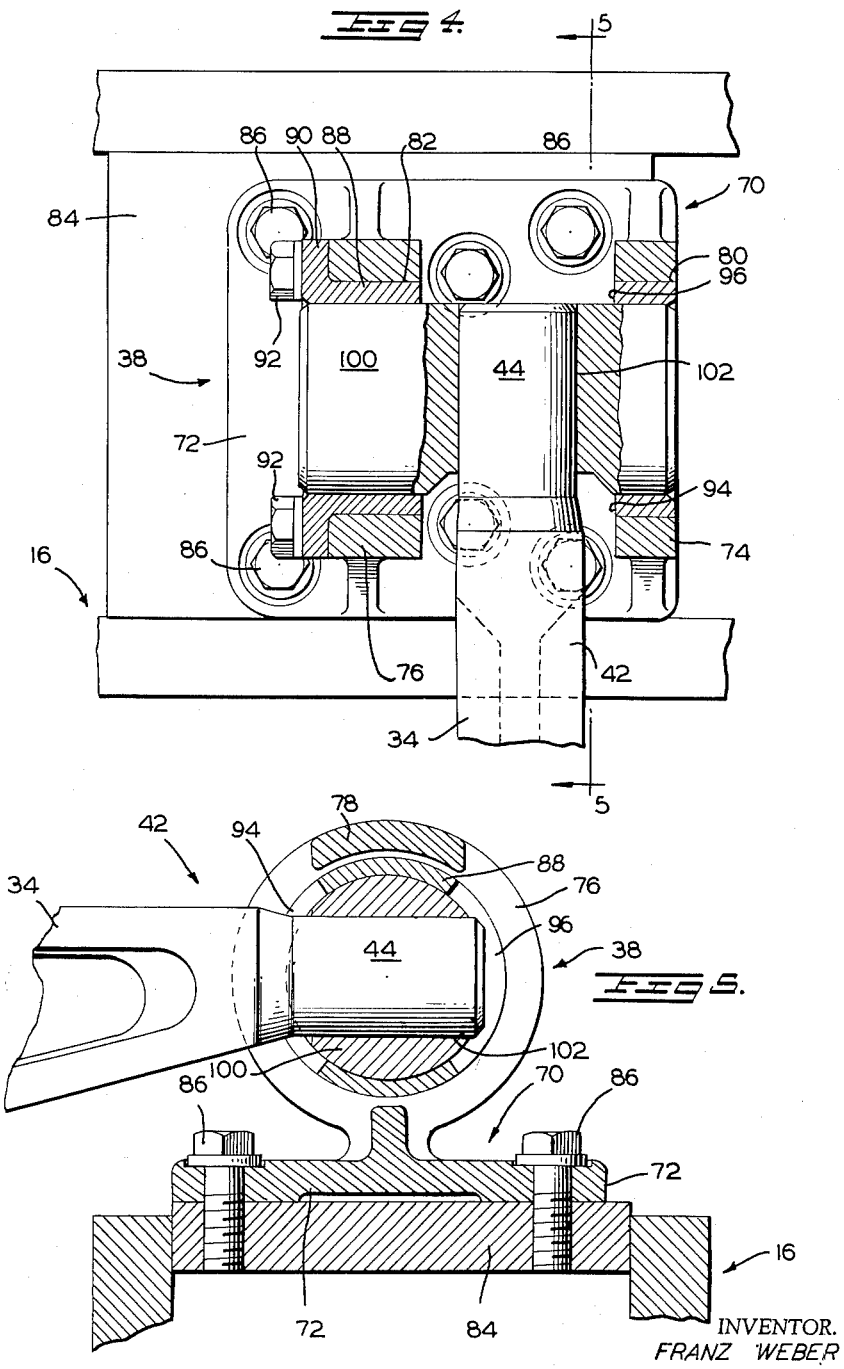

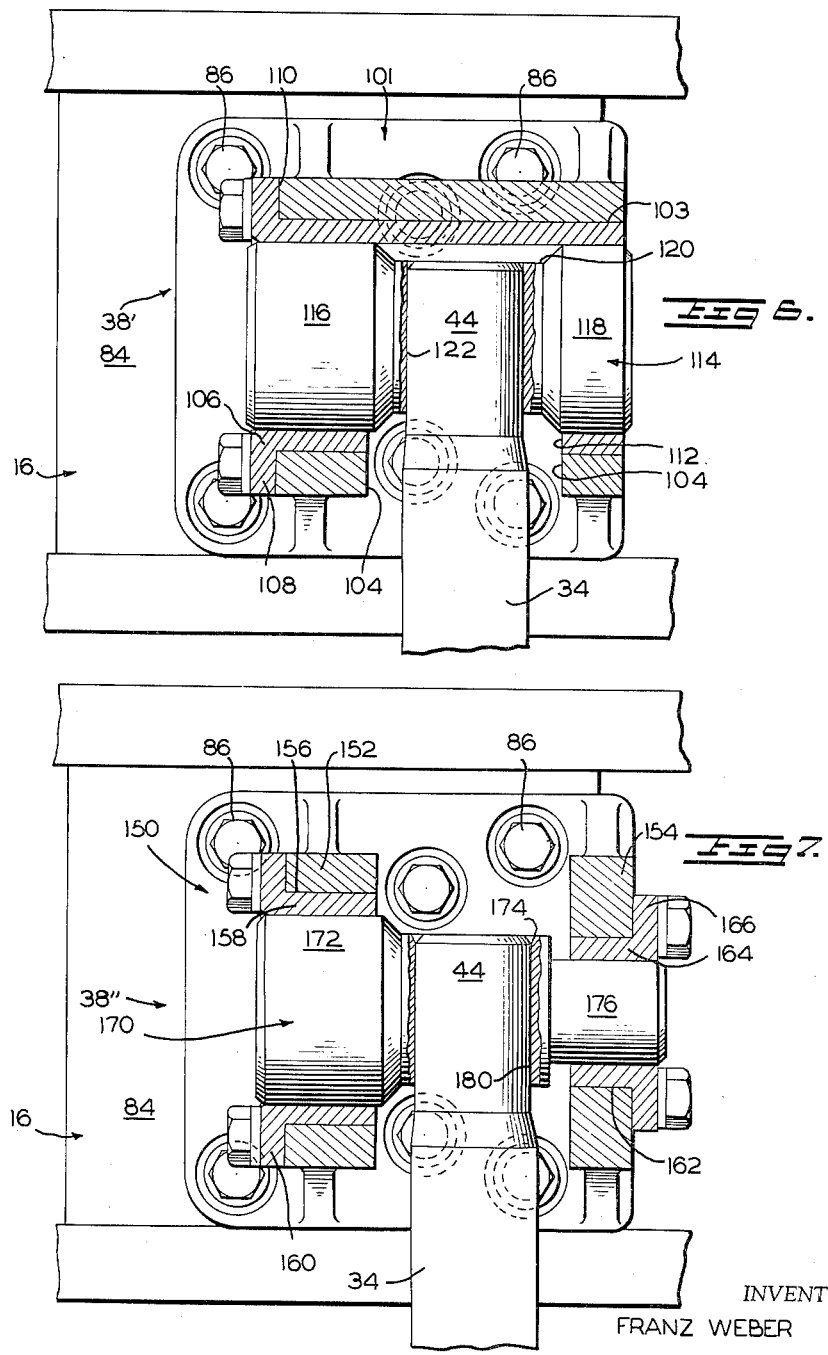

Franz Weber, Salt Lake City, Utah, assignor to The Eimco Corporation, Salt Lake City, Utah, a corporation of Delaware
Filed May 4, 1959, Ser. No. 810,812
1 Claim. (Cl. 180—9.5)

This invention relates to an improved suspension system for a material handling machine and, in particular, to an improved suspension system whereby the main frame of a material handling machine may be mounted on paired lateral crawler frames to permit relative up-and-down pivotal movement of the crawler frames while restricting independent vertical movement of the main frame relative to the crawler frames.

The present invention provides improvements in suspension systems having particular utility in combination with overhead rocker bucket type material handling machines such as disclosed in U.S. Patent 2,792,140, Daniel M. Schwartz, granted May 14, 1957.

It is a primary object of the present invention to provide a suspension system for a material handling machine that is sturdy in construction, relatively inexpensive in manufacture, and wherein the members permitting limited up-and-down pivotal movement of the paired lateral crawler frames of the material handling machine relative to the main frame of the vehicle are readily assembled during initial construction and assembly and disassembly for repair and/or replacement may be readily carried out in the field, thereby substantially reducing the down time of the machine.

These and other objects and advantages of the present invention will be more apparent to those skilled in the art from the following detailed description of the invention in light of the accompanying drawings wherein:

FIG. 1 is a bottom plan view of a material handling machine incorporating the suspension system of the present invention;

FIG. 2 is an enlarged fragmentary top plan view of the equalizer bar assembly of FIG. 1 showing the center pivotal connection thereof to the main frame of the vehicle and the means mounting the extended ends of the equalizer bar to the crawler frames;

FIG. 3 is a fragmentary front elevational view of the equalizer bar and mounting means of the present invention;

FIG. 4 is an enlarged top plan view in partial section of one of the mounting means for an end of the equalizer member;

FIG. 5 is a section substantially on line 5—5 of FIG. 4 with the illustrated end of the equalizer member shown in full;

FIG. 6 is a top plan view in partial section similar to FIG. 4 of a modified mounting means for an end of the equalizer member;

FIG. 7 is a top plan view in partial section similar to FIG. 6 of a further form of one of the mounting means for an end of the equalizer member; and FIG. 8 is a fragmentary view similar to FIG. 2 showing a modified form of equalizer member.

In general, the present invention is directed to a material handling machine having a body, a pair of frames carrying ground-engaging means, means pivotally mounting the rearward end of each of said pair of frames adjacent the rearward end of the body, a transversely extending equalizer member having extended cylindrical ends, means pivotally mounting said equalizer member adjacent the forward end of the body, means connecting the extended ends of the equalizer member to the frames carrying the ground-engaging means, said connecting means including a support member secured to each of the pair of frames, a bore through each of said support members, an elongated trunnion element slidably and rotatably received in each support member bore, a side opening in each of said support members, and a transverse bore in each of said trunnion elements opposite to said side opening receiving its respective cylindrical end of the equalizer member.

With particular reference to FIG. 1 of the drawings, there is shown a material handling machine embodying the principles of the present invention which generally comprises a main frame or body 10 pivotally mounted on individual crawler or self-laying track units 12 and 14.

Each of the endless track units 12 and 14 generally includes a frame member 16 which is recessed or bifurcated at its forward end and an idler wheel 18 is rotatably supported in conventional bearing means between the furcations of each frame member 16. The rearward end of each of the crawler frames is mounted adjacent the rearward end of the body 10 on bearing means generally designated 20 whereby each of the crawler frames may pivot about its bearing means 20 relative to the body 10 of the vehicle. The pivotal connections between the crawler frames 16 and the main frame 10 at the bearings 20 may be on the extended ends of the live axles 21 drivably supporting the driven sprocket wheels 22 for the crawler frame assemblies, as more fully disclosed in said U.S. Patent 2,792,140.

Each track frame 16 is provided with a generally rearwardly extending diagonal brace 24. The forward and larger end of each of the diagonal braces 24 is secured to its respective crawler frame 16 forwardly of the bearing connection between each crawler frame and the main frame of the machine.

The rearward end of each of the diagonal braces 24 is pivotally connected to the main frame or body 10 of the machine so that each track frame is free to pivot about the body 10. The rearward ends 30 of the diagonal braces are mounted on pivot shaft 26 maintained in brackets 28. The pivotal axis of the rearward ends 30 of the diagonal braces on pivot shaft 26 is axially aligned with the bearings 20 pivotally mounting each crawler frame 16 to the main frame of the vehicle as is well known in the art.

The forward end of each of the track frames 16 is connected to the main frame 10 of the machine through an equalizer member assembly generally designated 32. The equalizer assembly 32 includes an equalizer member 34 which is center-connected to the body 10 of the vehicle in bearing means 36 while the outboard ends of the equalizer member 34 are mounted to the respective crawler frames 16 in mount assemblies 38, as to be more fully described with reference to FIGS. 2 through 5.

The equalizer member assembly 32 has four primary functions: firstly, the weight of the forward end of the body 10 of the machine and its attached structures are transmitted to the ground-engaging laterally extending crawler frame units 12 and 14 therethrough; secondly, it transmits the substantial downward digging force from the body 10 to the paired laterally extending track frame units when the vehicle is employed in shoveling operations; thirdly, the equalizer member assembly permits relative pivotal movement between the crawler units and the body 10; and, fourthly, the equalizer member assembly provides the means whereby the weight of the body 10 and the weight of the crawler units are all effective to reduce the tendency of the material handling machine to overturn when vertical thrusts are applied thereto during operation of material handling attachments carried by the body 10 of the vehicle.

The equalizer member 34 may comprise a rigid shaft or forged steel member having a center portion 40 and end portions 42. The end portions 42 have cylindrical surfaces 14 which are circular in cross-section as more fully illustrated in FIGS. 2 through 5.

The equalizer member 34, as is known in the art, may be constructed of spring steel, or fabricated from a plurality of spring leaves as long as the equalizer member is provided with end portions as hereinabove described.

The equalizer member 34 is transversely bored midway between the ends thereof which bore receives a bushing 46.

The body 10 of the vehicle is provided with a pair of axially aligned and spaced bosses 48 and 50. Boss 48 is bored as at 52, and the bore receives a bushing 54. The other boss 50 is bored as at 56 and receives a bushing 58. A pivot pin 60 passes through the bushing 54 in the boss 48, the bushing 46 in the equalizer member 34 and into the bushing 58 in the boss 50. A member 64 bolted to the boss 48, by bolts 66, maintains the pivot pin 60 in operative engagement within the bosses 48 and 50. With this form of construction, it will be seen that the equalizer member 34 may pivot about the pin 60 aligned substantially on the center line of the body 10 of the vehicle whereby pivotal movement of the equalizer member 34 about the pivot pin 60 causes the ends 42 of the member to move up and down relative to the body 10.

Each of the means 38 for mounting the cylindrical ends 44 of the equalizer member 34 to the respective crawler frames 16 generally comprise a support member or bracket 70 having a base portion 72, ends 74 and 76 and a top portion 78 interconnecting with the base portion 72 the end elements 74 and 76 into a box-like formation. Each of the ends 74 and 76 is bored as at 80 and 82, respectively, and the bores 80 and 82 are axially aligned. Each bracket member 70 is secured to a top plate 84 of its crawler frame 16 by a plurality of bolts 86 which are threaded into tapped bores in the respective top plates 84 as more clearly shown in FIGS. 4 and 5. The axially aligned bores 80 and 82 in each pair of ends 72 and 76 of each bracket 70 may be provided with a removable flanged bushing generally designated 88 with the flange 90 thereof secured to the face of its end 76 by bolt elements 92. Each bushing 88 is provided with openings 94 and 96 as more clearly illustrated in FIGS. 4 and 5 of the drawings.

An elongated cylindrical trunnion member 100 is slidably received in each of the bushings 88. Each elongated cylindrical trunnion member 100 is of uniform diameter throughout its length whereby it is slidable in the aligned bores in its respective ends 74 and 76 and the length of each cylindrical trunnion member is such that with the trunnion member in its operative position it extends substantially the full length of the bushing 88 through ends 74 and 76.

Each elongated cylindrical trunnion member 100 is provided with a transverse bore 102. The diameter of the bore 102 in each trunnion member 100 is of such size as to slidably receive a cylindrical extended end 44 of the equalizer member 34.

In operation of the suspension system, for material handling machines of the present invention, as the material handling machine traverses uneven ground the individual crawler frames 16 are free to cooperatively pivot up and down with respect to the body 10 of the vehicle. The pivotal axis, as hereinbefore described, is the axis of the bearings 20 carried by each of the frames 16 and the axis of pivot shaft 26 for the diagonal braces 24. As the crawler frames 16 pivot up and down, the equalizer member assembly 32 also pivots about the pivot pin 60, and the following motions take place between each end 42 of the equalizer member 34 and its mounting means 38: the distance between the center of the bore through the ends 74 and 76 and the center of the pivot pin 60 supporting the equalizer bar increases and the cylindrical ends 44 of the equalizer member 34 withdraw slightly from the bores 102 in the trunnion members 100; the angular relationship between the crawler frame units and the equalizer member 34 changes and the cylindrical ends of the equalizer member 34 rotate in the respective bores 102 in the trunnion elements 100 while the trunnion elements 100 rotate in their respective bushing 88 provided in the aligned bores in the ends 74 and 76 of the brackets 70; and the trunnion elements 100 slidably shift along the axis of the bushings 88. These motions between each of the cylindrical ends 44 of the equalizer member 34 and the attaching means 38 provide for substantially universal movement between the equalizer member 34 and the crawler frames 16; however, it will be particularly noted that the present construction prevents movement in a vertical direction between the ends 42 of the equalizer member 34 and the crawler frames 16 whereby the body 10 of the vehicle cannot be pivoted, independently of frames 16, about the axis of bearings 20 and pivot shaft 26 whereby the weight of the body 10 combined with the weight of each of the crawler frames 16 is effective to prevent overturning of the vehicle when an upward thrust is applied to the body 10 during operation of the material handling machine when used as, for example, the support for an overhead rocker type material handling structure such as disclosed in U.S. Patent 2,792,140, D. M. Schwartz.

It will also be appreciated that with the construction hereinbefore described that assembly and disassembly for replacement or repair of the means 38 attaching the ends 42 of the equalizer member 34 to the paired lateral crawler frames 16 is very readily accomplished by merely removing the bolts 86 securing one of the brackets 70 to its top plate 84 and sliding the assembly 38 including its trunnion element 100 and bracket 70 from the particular cylindrical end 44 of the equalizer member 34. With the cylindrical end 44 removed from the bore 102 in the trunnion element 100 it is then possible to merely slide the trunnion element 100 out of the bushing 88 in either direction. In assembling one of the structures, the reverse procedure is followed and its trunnion element 100 is inserted slidably within the bushing 88; the respective cylindrical end 44 of the equalizer member 34 is then slidably inserted in the bore 102 of the trunnion element 100 and the bracket 70 is again bolted to its respective crawler frame. It will also be particularly noted that the box-like form of the brackets 70 provides a very rigid construction which will withstand substantial twisting torques without imposing damaging stresses on the ends 74 and 76 of the brackets 70.

Other forms of generally cylindrical trunnion elements may be employed within the scope of the present invention and modified forms of the improved connecting means are illustrated in FIGS. 6 and 7.

Referring to FIG. 6 where like parts are designated with the same reference numerals as employed with reference to the form of the invention shown in FIG. 4, each of the means 38' for mounting the cylindrical ends 44 of the equalizer member 34 to the respective crawler frames 16 generally includes a support member or bracket 101. Each bracket 101 is secured to plate 84 of its crawler frame 16 by a plurality of bolts 86 which are threaded into tapped bores in the respective top plates 84. Each support member 101 is bored as at 103 and is provided with a side opening 104. The bores 103 of the support elements 101 may be provided with removable flanged bushings generally designated 106 with the flanges 108 thereof secured to the face 110 of its support element 101. Each bushing 106 is provided with a side opening 112 corresponding to the side opening 104 in its support element 101. Each bushing 106 receives an elongated generally cylindrical trunnion member 114 which trunnion members are provided with bearing surfaces generally designated 116 and 118 and a reduced cylindrical center section 120. Each of the trunnion elements 114 is also provided with a transverse bore 122 within the reduced cylindrical center section 120. The diameter of the bore 122 in each trunnion member 114 is of such size as to slidably receive a cylindrical extended end 44 of the equalizer member 34.

Referring to FIG. 7 where like elements are designated with the same reference numerals as employed in the description of the form of the invention shown in FIG. 4, each of the means 38″ for mounting the cylindrical ends 44 of the equalizer member 34 to the respective crawler frames 16 generally comprises a support member or bracket 150. The brackets 150 are bolted to the top plates 84 of their respective crawler frames 16 by a plurality of bolts 86. Each support member 150 includes a pair of end elements 152 and 154. Each end element 152 is bored as at 156 which bore is adapted to receive a flanged bushing 158. The flange 160 of each bushing 158 is bolted to a face of its end element 152.

Each end 154 of support elements 150 is also bored as at 162. The bores 162 are concentric with the bores 156 in the respective ends 152. Bores 162 are adapted to receive flanged bushings 164 with the flanges 166 thereof being bolted to one face of its respective end element 154. A generally cylindrical trunnion member 170 is slidably received in the bushings 158 and 164 of each support member 150. Each generally cylindrical trunnion member 170 has a cylindrical bearing surface 172; a reduced portion 174 and a cylindrical bearing surface 176, which cylindrical bearing surface is shown to be of a lesser diameter than the cylindrical bearing surface 172 at the other end of the trunnion member 170.

Each of the elongated generally cylindrical trunnion members 170 is provided with a transverse bore 180. The diameter of the bore 180 in each trunnion member 170 is of such size as to slidably receive a cylindrical extended end 44 of the equalizer member 34.

The operation of the form of the invention shown in FIG. 7 is substantially the same as the operation of the form of the invention disclosed with reference to FIG. 4 except that since each trunnion member 170 has different diameter bearing surfaces 172 and 176, the trunnion members must be inserted within their support members 150 through the bore 156 in the respective end elements 152 and 154.

In FIG. 8 there is shown a modified equalizer member 34′. The equalizer member 34′ has end portions 42′ having cylindrical bearing surfaces 44′ which are circular in cross-section for reception in the mounting means 38, 38′ or 38″ hereinbefore described. The center portion 200 of the equalizer member 34′ is of split construction to provide a pair of structural elements 202 and 204, each of which is bored as at 206 and 208, respectively.

A boss 210 depending from the main frame of the vehicle is received between the spaced elements 202 and 204. The boss 210 is bore as at 212 and the equalizer member 34′ is pivoted thereto by means of pivot pin 214. The pivot pin 214 may be secured in the bores 206, 208, and 212 by retainer means 216 and 218 secured to elememtents 202 and 204 of the equalizer member 34′.

While there has been disclosed a preferred and other forms of the present invention, it is to be understood that the invention is not limited thereto, but may comprise other constructions, details and features without departing from the spirit of the invention.

I claim:

In a material handling machine having a body, a pair of side frames carrying ground-engaging means, means pivotally mounting the rearward end of each of the side frames to the body adjacent the rearward end thereof, a transversely extending equalizer member having cylindrical extended ends, means pivotally mounting the equalizer member to the body adjacent the forward end thereof; the improvement comprising means connecting the extended ends of the equalizer member to the side frames for limited universal movement while restraining independent up and down movement between the ends of the equalizer member and the side frames including a substantially rectangular bracket having a base portion, a pair of side members and a top portion for each of the pair of side frames, means securing the base portion of each respective bracket to its respective frame of the pair of side frames, an axially aligned bore through each of said pair of side members of each bracket, an elongated cylindrical member slidably received in the bores in each of the side members of each bracket, said elongated cylindrical members being of uniform diameter throughout their length whereby said members are slidable through the aligned bores in said side members of the respective brackets, and a transverse bore in each of said cylindrical members receiving the respective cylindrical ends of the equalizer member.

References Cited in the file of this patent

UNITED STATES PATENTS

| | | |
|---|---|---|
| 998,210 | Slentz | July 18, 1911 |
| 1,395,021 | Whitnall | Oct. 25, 1921 |
| 2,653,838 | Danly et al. | Sept. 29, 1953 |
| 2,792,140 | Schwartz | May 14, 1957 |
| 2,919,942 | Bechtel | Jan. 5, 1960 |

FOREIGN PATENTS

| | | |
|---|---|---|
| 437,796 | Great Britain | Nov. 5, 1935 |